US007284935B2

(12) United States Patent
Povich

(10) Patent No.: US 7,284,935 B2
(45) Date of Patent: Oct. 23, 2007

(54) ROTARY CUTTING TOOL

(75) Inventor: David J. Povich, Huntington Beach, CA (US)

(73) Assignee: Ultra-Tool International Incorporated, Huntington Beach, CA (US)

( * ) Notice: Subject to any disclaimer, the term of this patent is extended or adjusted under 35 U.S.C. 154(b) by 0 days.

(21) Appl. No.: 11/362,685

(22) Filed: Feb. 27, 2006

(65) Prior Publication Data

US 2007/0201957 A1 Aug. 30, 2007

(51) Int. Cl.
*B23C 5/00* (2006.01)

(52) U.S. Cl. ............................ 407/60; 407/62; 407/11

(58) Field of Classification Search .................. 407/60, 407/63, 62, 54, 11
See application file for complete search history.

(56) References Cited

U.S. PATENT DOCUMENTS 725,374 A 4/1903 Reamer
1,948,057 A 2/1934 Tscherne
2,124,818 A 7/1938 Gouverneur
2,782,490 A 2/1957 Graves
4,227,837 A 10/1980 Yodoshi
4,662,803 A * 5/1987 Arnold ....................... 408/224
4,740,121 A * 4/1988 Arnold ....................... 408/224
4,844,666 A 7/1989 Tsujimura et al.
4,963,059 A * 10/1990 Hiyama ....................... 407/60
6,899,494 B2 * 5/2005 Walrath ....................... 407/54
6,991,409 B2 * 1/2006 Noland ....................... 407/63
2003/0118411 A1 6/2003 Flynn et al.
2005/0105973 A1 5/2005 MacArther

* cited by examiner

*Primary Examiner*—Willmon Fridie, Jr.
(74) *Attorney, Agent, or Firm*—John K. McCulloch

(57) ABSTRACT

A rotary cutting tool comprises a body having opposite ends and a plurality of diametrally opposed pairs of flutes forming cutting edges extending helically from one end of the body toward the opposite end. All of the cutting edges are circumferentially spaced uniformly from one another at the one end of the body. Each cutting edge of one pair of edges is formed on the same and uniform helix, whereas each cutting edge of another pair of edges is formed on a uniform helix which varies from the cutting end of the body toward the opposite end. The steepness of the helices is such that no flute communicates with any other flute and, at a zone between the ends of the flutes, the cutting edges formed by such flutes again are uniformly circumferentially spaced from one another.

17 Claims, 2 Drawing Sheets

ROTARY CUTTING TOOL

This invention relates to a rotary cutting tool, such as an end mill, and more particularly to such a tool having superior chatter and vibration reduction, improved machining efficiency, and higher productivity.

BACKGROUND OF THE INVENTION

Rotary cutting tools, such as end mills, are well known in the art and are used for a variety of machining operations such as slot, pocket, ramp plunging, and peripheral milling of workpieces.

Previously known tools of this kind commonly have multiple flutes which form a corresponding plurality of cutting edges. Some of the known tools have all flutes formed on the same helix, whereas some have alternating flutes formed on different helices which are constant from one end of the flute to the other.

Although the known tools perform fairly satisfactorily, it is desirable to provide an improved tool which reduces chatter and vibration during use, minimizes harmonics produced during machining operations, and improves the ability of the tool to perform its milling functions, as well as vastly improving the milled surfaces of a workpiece. A tool constructed in accordance with the invention achieves these objectives.

SUMMARY OF THE INVENTION

A rotary cutting tool constructed in accordance with the preferred embodiment of the invention comprises an elongate, generally cylindrical body having a longitudinal axis of rotation and a plurality of pairs of helical flutes extending from one end of the body toward the opposite end. The flutes of each pair of flutes are diametrally opposite one another. The flutes of one pair of flutes are formed on a uniform helical angle having a constant pitch from end to end. The flutes of another pair of flutes, however, are formed on a common helix the pitch of which varies from one end of the body toward the other.

At the cutting end of the body of a tool formed according to the invention the circumferential spacing between all adjacent flutes is uniform. However, except for at least one zone axially spaced from the cutting end of the body the circumferential spacing between adjacent flutes is non-uniform. At such zone the circumferential spacing between adjacent flutes also is uniform and corresponds to the spacing between adjacent flutes at the cutting end of the body.

Preferably, the several flutes are formed and circumferentially spaced from one another in such manner that no flute communicates with or intersects any other flute.

All of the flutes commence at the cutting end of the tool body and extend toward the opposite end thereof. If desired, the face of the cutting end of the tool body allows for true plunge or ramp milling, as well as the provision of a ball radius.

THE DRAWINGS

The presently preferred embodiment of the invention is illustrated in the accompanying drawings wherein.

Figure 1:
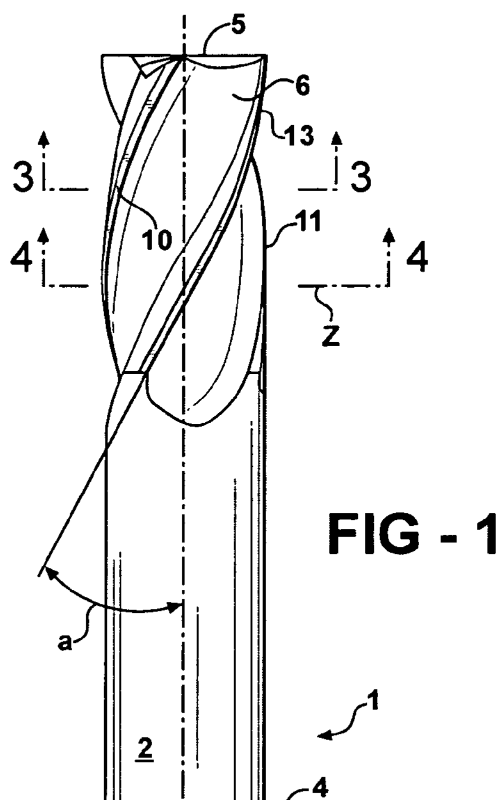
FIG. 1 is an elevational view of a rotary cutting tool embodying the invention.
Figure 2:
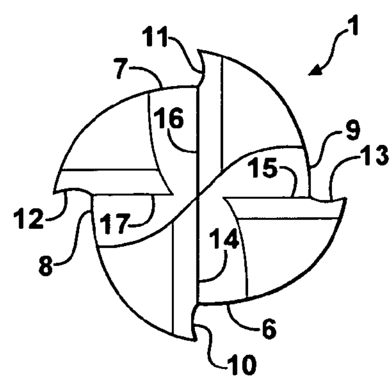
FIG. 2 is an end view, on an enlarged scale, of the cutting end of the tool.
Figure 4:
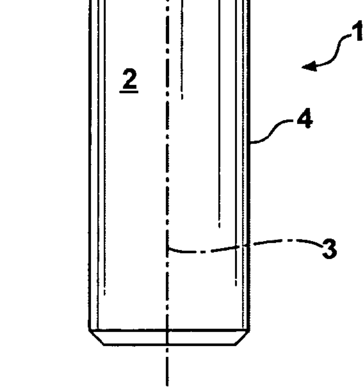
Figure 3:
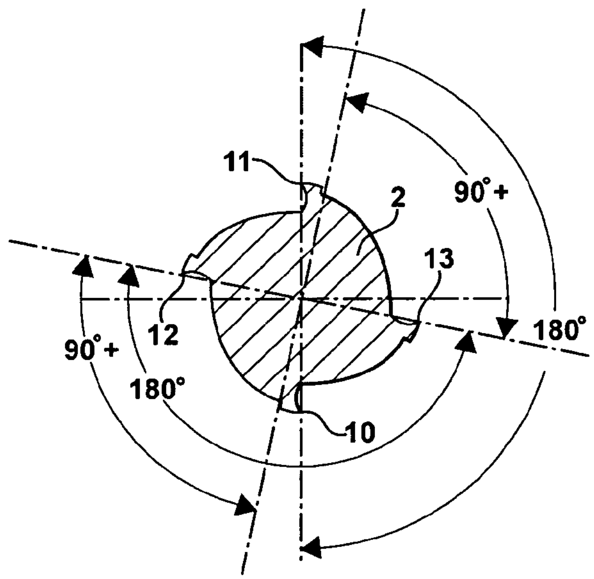
Figure 5:
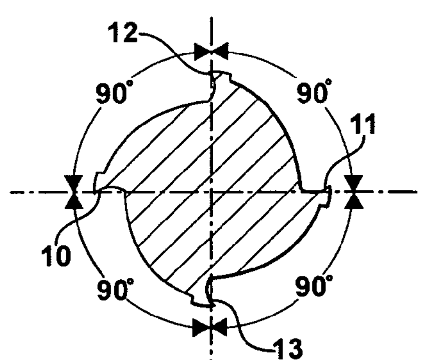
Figure 6:
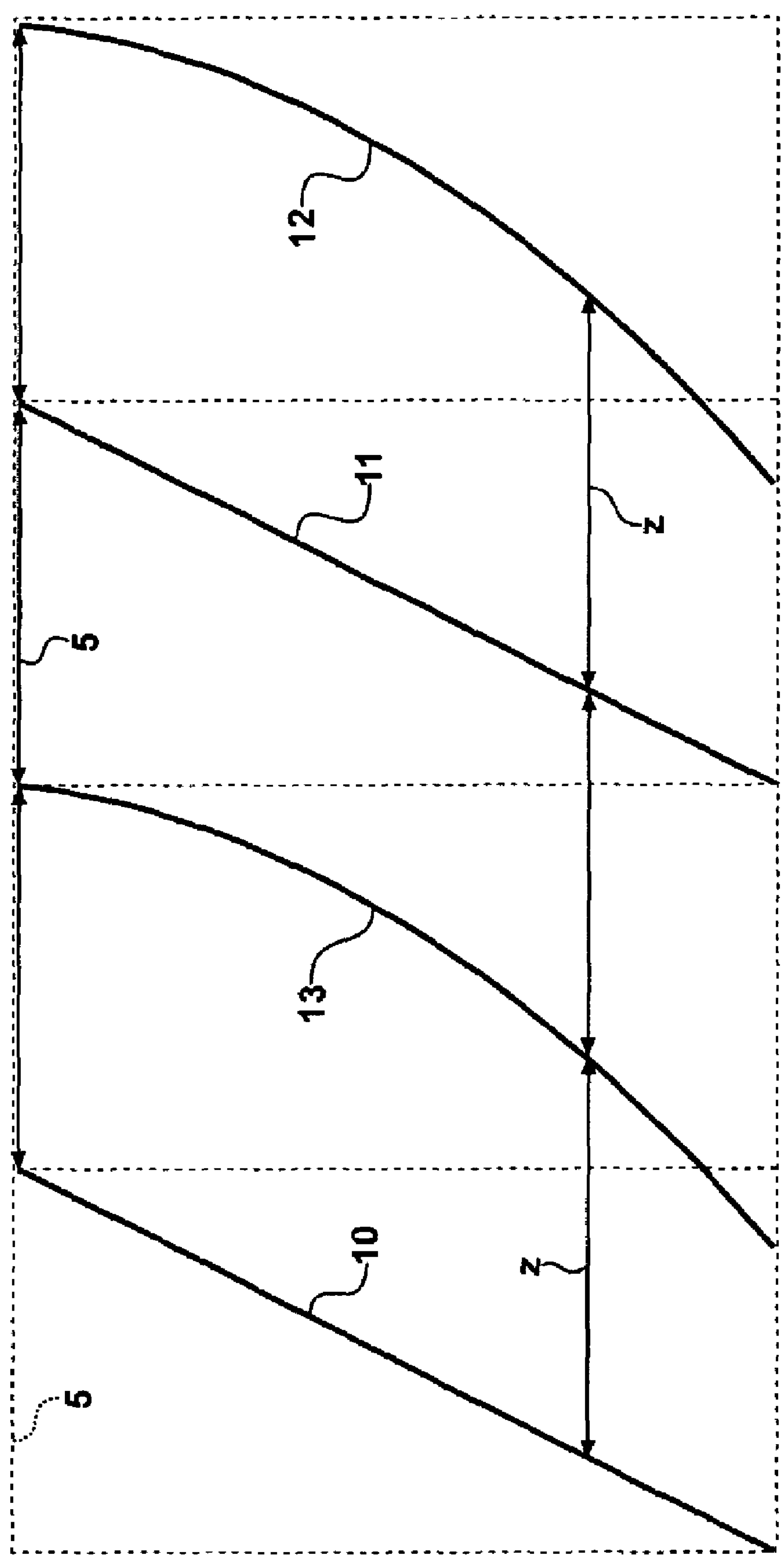

FIGS. 3 and 4 are sectional views taken on the lines 3-3 and 3-4, respectively, of FIG. 1;

FIG. 5 is a diagrammatic illustration of the helix and length of selected flutes; and FIG. 6 is a schematic development view of the tool showing the disposition of the cutting edges or flutes.

THE PREFERRED EMBODIMENT

The cutting tool constructed in accordance with the preferred embodiment is designated by the reference character 1 and comprises a generally cylindrical body 2 of selected length and diameter and having a longitudinally extending axis 3 of rotation. The tool body 2 has a shank 4 one end of which may be fitted to a rotary chuck or other driver (not shown) and terminating at its opposite end in a cutting zone or end 5 from which a plurality of pairs of helical flutes 6, 7 and 8, 9 extend toward the opposite end of the tool body. The flutes 6 and 7 constitute a first pair of flutes which are diametrally opposite one another. The flutes 8 and 9 constitute a second pair of flutes which also are diametrally opposite one another. The flute 6 forms a helical cutting edge 10, the flute 7 forms a helical cutting edge 11, the flute 8 forms a helical cutting edge 12, and the flute 9 forms a helical cutting edge 13. The face of the cutting end of the body is formed with cutting edges 14, 15, 16, and 17, thereby providing cutting teeth at the cutting end of the tool.

At the cutting end 5 the flute 6 is adjacent and circumferentially spaced 90° from each of the adjacent flutes 8 and 9, and the flute 7 similarly is circumferentially spaced 90° from the two adjacent flutes 8 and 9. The flute 8, in turn, is spaced 90° from the flutes 6 and 7 and is diametrally opposite the companion flute 9 which is circumferentially spaced 90° from the adjacent flutes 6 and 7.

From the cutting end 5 each flute 6 and 7 of the first pair of flutes extends helically toward the opposite end of the tool body 2 at a helical angle a which, in the illustrative embodiment, is at about 34° to the longitudinal axis 3 of the tool body. The cutting edges 10 and 11 formed by the flutes 6 and 7 therefore extend axially at a constant or uniform helix of about 34° for the entire length of each flute.

The flutes 8 and 9 of the second pair of flutes also extend helically from the cutting end 5 toward the opposite end of the body 2, but at a helical angle which not only is different from that at which the flutes 6 and 7 extend, but also varies throughout its length. In the illustrated embodiment each of the flutes 8 and 9 commences at the cutting end 5 of the tool body and extends for the full length of flute (LOF) at a helical angle which increases from about 30° at a constant rate of increase to about 41°, as is shown in FIG. 5. The cutting edges 12 and 13 formed by the flutes 8 and 9 also extend helically at the same helical angle as their respective flutes.

A particularly advantageous characteristic of the invention is that, at least at one zone between opposite ends of the cutting edges, adjacent flutes and cutting edges once again are circumferentially uniformly spaced from one another. This zone is identified in FIGS. 1 and 6 by the reference character Z which is located about 73% of the length of the flutes and cutting edges in a direction from the cutting end 5 toward the opposite end of the tool body.

In the four flute construction shown in the drawings the circumferential spacing between adjacent flutes at the zones 5 and Z is 90°. If more than two pairs of diametrally opposite flutes are formed in a tool body the circumferential spacing will be less than 90° at the zones of uniform spacing.

The relative circumferential positions of the cutting edges 10-13 along the length of each relevant flute are shown in FIG. 6 wherein the circumferential spacing between the flutes 6 and 7 of the first pair of flutes is constant and the circumferential spacing between the cutting edges 12 and 13 differs from one another and from the edges 10 and 11 and varies except at the cutting end 5 and the zone Z.

The circumferential width of each flute, the axial length of each flute, and the steepness of the helix on which each flute is formed are such that no flute intersects or communicates with any other flute. Consequently, chip flow through the flutes is not impeded.

The arrangement is one wherein each of the flutes of one diametrally opposed pair of flutes is formed on a uniform helix which extends over the length of the flute (LOF), whereas each of the flutes of an adjacent pair of diametrally opposed flutes is formed on a helix which is the same for each of such pair of flutes, but is different from the helix on which the one pair of flutes is formed. Further, the cutting edges of all of the flutes are uniformly circumferentially spaced from one another at the cutting end of the tool and are identically circumferentially spaced from one another at a zone axially spaced from such cutting end. This arrangement increases stability and balance of the tool while minimizing and breaking up the harmonics generated during machining operations, thereby leading to highly desirable effects such as the ability to mill at deep axial depths, higher machining efficiency, and vastly improved part finishes along with higher productivity.

The construction in which two diametrally opposite flutes of a pair of flutes start from the cutting end of the tool and extend at a uniform and constant helical angle, and wherein two diametrally opposed flutes of another pair thereof start at the cutting end and extend therefrom at a lesser helix which increases uniformly to one that is greater than the helix of each flute of the other pair of flutes has been found to effect a substantial reduction in chatter and vibration during the use of the tool.

In the illustrated embodiment the helix of each of the flutes 8 and 9 starts at an angle less than that at which each of the flutes 6 and 7 starts, but then exceeds the helix of the flutes 6 and 7. It is possible, however, to reverse the arrangement so that the helix on which each of the flutes 8 and 9 is formed decreases in a direction from the cutting face 5 toward the opposite end of the tool body.

The illustrated embodiment includes only two pairs of diametrally opposed flutes. However, depending on the diameter and circumference of the tool body additional diametrally opposed flutes may be provided. In all embodiments the length and steepness of the flutes are such that no flute intersects or communicates with any other flute.

The disclosed embodiments are representative of presently preferred forms of the invention, but are intended to be illustrative rather than definitive thereof. The invention is defined in the claims.

I claim:

1. A rotary cutting tool comprising a body rotatable about a longitudinal axis and having a cutting end and an opposite end; a plurality of pairs of flutes forming cutting edges each of which is of such length as to extend from said cutting end of said body toward the opposite end thereof but terminate short of the opposite end of said body; the cutting edges of a first pair of said flutes being diametrally opposite one another; the cutting edges of a second pair of said flutes being diametrally opposite one another; the cutting edges of said first pair of flutes being circumferentially spaced from one another and from the cutting edges of said second pair of flutes at said cutting end of said body; each of the cutting edges of said first pair of flutes extending from said cutting end of said body at a uniform, corresponding helical angle; each of the cutting edges of said second pair of flutes extending from said cutting end of said body at a non-uniform, corresponding helical angle different from that at which the cutting edges of said first pair of flutes extend; the helical angle at which each cutting edge of said second pair of cutting edges extends varying uniformly in a direction commencing at said cutting end of said body; the cutting edges of said first and second pairs of flutes being of such length and the helical angle of the cutting edges of said second pair of flutes being such that at a zone between opposite ends of said cutting edges of said pairs of cutting edges the circumferential spacing between the cutting edges of said first and second pairs of flutes corresponds to that at said cutting end of said body.

2. The cutting tool according to claim 1 wherein except at said cutting end of said body and at said zone the circumferential spacing between the cutting edges of said first and second pairs of flutes varies.

3. The cutting tool according to claim 1 wherein the helical angles at which the flutes of said second pair of flutes extend from said cutting end of said body correspond to each other.

4. The cutting tool according to claim 1 wherein said zone is about 73% of the axial length of the cutting edges of said first pair of flutes measured in a direction from said cutting end of said body toward the opposite end thereof.

5. The cutting tool according to claim 1 wherein said pairs of flutes are at least two in number.

6. The cutting tool according to claim 1 wherein the helical angle of each cutting edge of said first pair of flutes is about 34° relative to said longitudinal axis.

7. The cutting tool according to claim 1 wherein the helical angle of each cutting edge of said second pair of flutes relative to said longitudinal axis varies from about 30° at said cutting end of said body to about 41°.

8. The cutting tool according to claim 1 wherein the helical angle and the axial length of each cutting edge of said second pair of flutes are such as to preclude communication between the flutes of said second pair of flutes and the flutes of said first pair of flutes.

9. A rotary cutting tool comprising a generally cylindrical body rotatable about a longitudinal axis and having a cutting end and an opposite end; a plurality of pairs of helical flutes forming a corresponding plurality of helical cutting edges, each of which is of such length as to extend from said cutting end of said body toward the opposite end thereof but terminate short of said opposite end of said body, the flutes of each pair of flutes being diametrally opposite one another; the flutes of a first pair of said flutes being circumferentially spaced from one another and from the flutes of a second pair of said flutes; the circumferential spacing between adjacent flutes at said cutting end of said body being uniform; each of the flutes of said first pair of said flutes extending from said cutting end of said body at a corresponding, uniform helical angle; and each of the flutes of said second pair of flutes extending from said cutting end of said body at a corresponding, uniformly varying helical angle different from that of the flutes of the first pair of flutes, the respective helical angles and lengths of said pairs of flutes being so selected that the circumferential spacing between adjacent cutting edges formed by said flutes is the same at said cutting end of said body and at a zone axially spaced from said cutting end and from the opposite ends of said cutting edges.

10. The cutting tool according to claim 9 wherein the helical angle at which the flutes of said second pair of flutes extend from said one end of said body varies uniformly from one that is less than that of the flutes of said first pair of flutes to one that is greater than that of the flutes of said first pair of flutes.

11. The cutting tool according to claim 9 wherein the flutes of said pairs of flutes are at such helical angles that none of said flutes communicates with any other of said flutes.

12. The cutting tool according to claim 9 wherein the circumferential spacing between adjacent flutes is non-uniform at positions other than at said one end and at said zone.

13. A rotary cutting tool comprising a body having a longitudinal axis and opposite ends one of which is a cutting end, said tool comprising a plurality of pairs of circumferentially spaced helical flutes forming a corresponding plurality of helical cutting edges extending from said cutting end of said body toward the opposite end thereof; the flutes of a first pair of said flutes extending along corresponding first helices; the flutes of another pair of said flutes extending along corresponding second helices different from the first helices; said first helices being angularly uniform from end to end; said second helices being non-uniform and varying angularly uniformly from end to end; the circumferential spacing between adjacent flutes being uniform at two axially spaced zones and non-uniform elsewhere, one of said zones being at said cutting end and the other of said zones being between said cutting end and those ends of each of said flutes remote from said cutting end.

14. The cutting tool according to claim 13 wherein said other of said zones is at about 73% of the distance from said one end of said body to that end of the flutes which is remote from said one end of said body.

15. The cutting tool according to claim 13 wherein the flutes of each pair of said flutes are diametrally opposite one another.

16. The cutting tool according to claim 15 wherein there are two pairs of said flutes.

17. The cutting tool according to claim 13 wherein said first helices are about 34° relative to said longitudinal axis and the second helices vary uniformly from about 30° at said one end of said body to about 41° relative to said axis.

* * * * *